Dec. 24, 1957 M. J. GIELEGHEM 2,817,551
BALL JOINT ASSEMBLY
Filed Aug. 3, 1953
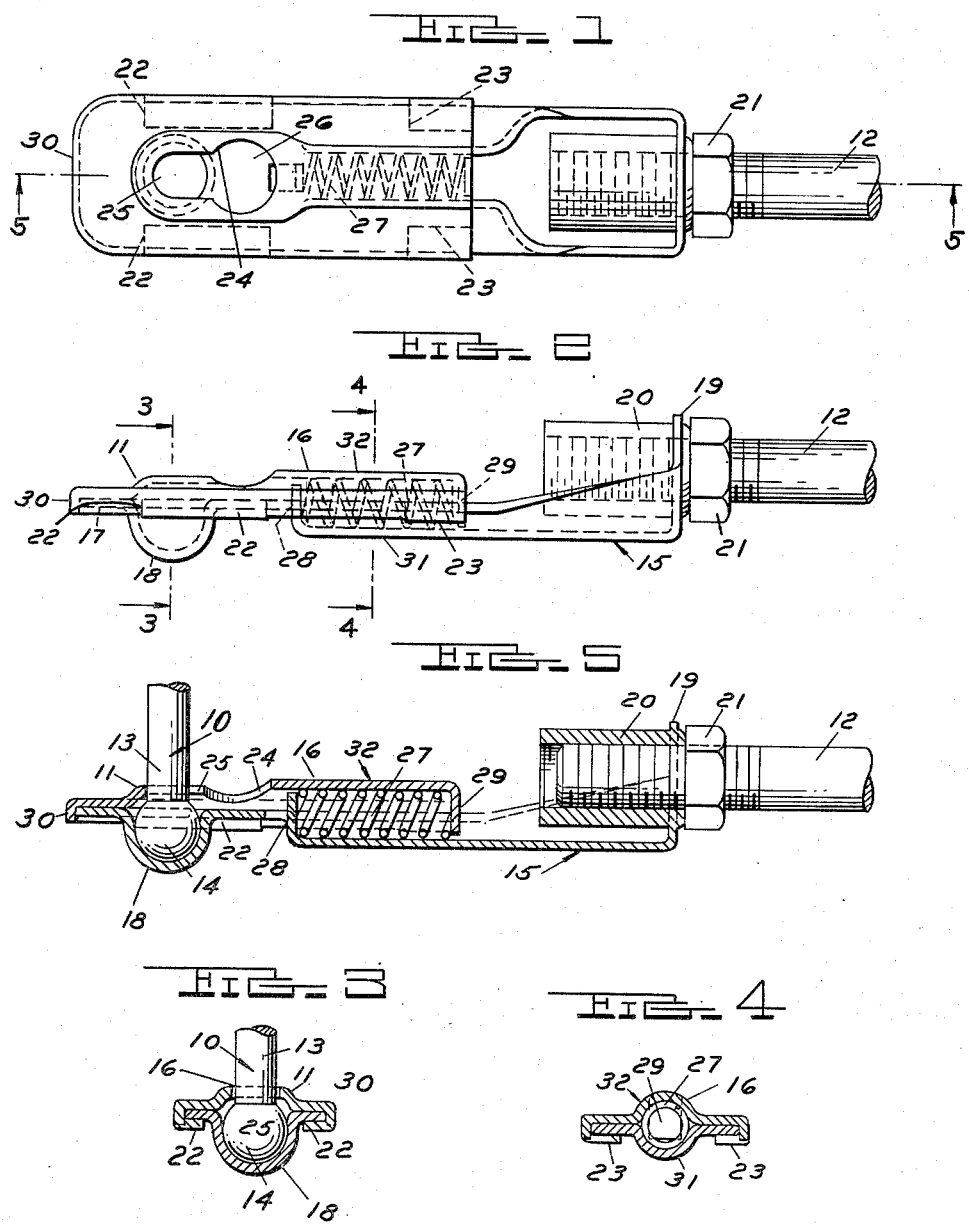
INVENTOR.
MAURICE J. GIELEGHEM
BY
ATTORNEYS

United States Patent Office 2,817,551
Patented Dec. 24, 1957

2,817,551

BALL JOINT ASSEMBLY

Maurice J. Gieleghem, Detroit, Mich., assignor to Claude Sintz, Inc., Detroit, Mich., a corporation of Michigan Application August 3, 1953, Serial No. 371,890

5 Claims. (Cl. 287—90)

This invention relates generally to ball joints and refers more particularly to improvements in a ball retaining holder for such joints.

It is an object of this invention to provide a holder for a ball type connection rendering it possible to readily remove and/or install the ball member without the use of tools or without dismantling the parts of the holder.

It is another object of this invention to provide a holder having provision for adjustably supporting the latter and thereby enable locating the ball joint in any preselected position.

It is still another object of this invention to provide a holder having relatively slidable sections capable of being readily produced on a production basis from simple stamping operations.

The foregoing as well as other objects of this invention will be made more apparent as this description proceeds especially when considered in connection with the accompanying drawing wherein:

Figure 1 is a side elevational view of a ball type connection embodying a holder constructed in accordance with this invention;

Figure 2 is a plan view of the construction shown in Figure 1;

Figure 3 is a sectional view taken on the line 3—3 of Figure 2;

Figure 4 is a sectional view taken on the line 4—4 of Figure 2; and

Figure 5 is a sectional view taken on the line 5—5 of Figure 1.

The ball joint selected for the purpose of illustrating the present invention comprises a ball member 10, a holder 11, and a supporting bar 12. The ball member 10 may be of any suitable type and is shown herein as comprising a stud 13 having a spherically shaped head 14.

The holder 11 comprises essentially two sections 15 and 16 preferably formed of sheet metal and designed to enable producing the same on a high volume production basis by relatively simple stamping operations. In any case, the section 15 is fashioned adjacent the end 17 with a depressed hemispherically shaped portion forming an upwardly opening socket 18 of a dimension to receive the head 14 on the ball member 10 and provide a pivotal connection therewith. The opposite end of the section 15 is turned upwardly to provide a flange 19 having an opening therethrough for receiving the adjacent end of the supporting bar 12. In the present instance, a nut 20 is welded or otherwise secured to the flange 19 in alignment with the opening therethrough and internally threaded for threadedly engaging the supporting bar 12. Thus, the holder 11 may be adjusted along the supporting bar 12 to vary the position of the socket 18 or ball member 10 and, if desired, a lock nut 21 may be provided on the supporting bar 12 for securing the holder 11 in its adjusted position with respect to the supporting bar 12.

The section 16 overlies the section 15 and is supported by the latter for sliding movement lengthwise of the sections. As shown in Figure 3 of the drawings the end portions of the section 16 adjacent the socket 18 have tabs 22 projecting from opposite longitudinal edges of the section 16 and bent laterally inwardly to overlie the bottom surface of the section 15. Similar tabs 23 are provided at the opposite end of the section 16 and these tabs cooperate with the tabs 22 to slidably connect the two sections together.

As shown in Figure 2 of the drawings, a keyhole shaped slot 24 is formed in the section 16 and extends in the direction of length of the sections. The location of the slot 24 is predetermined so that when the sections are in their innermost positions with respect to one another the relatively narrow part 25 of the slot registers with the open end of the socket 18 and in the outermost relative positions of the sections the enlarged part 26 of the slot 24 registers with the socket 18. The diameter of the enlarged part 26 of the slot 24 exceeds the diameter of the head 14 on the ball member 10 and permits the ball member to be inserted into the socket when the enlarged portion 26 registers with the socket. The relatively narrow part 25 of the slot 24 is of greater width than the shank of the stud 13 and is of less width than the diameter of the ball 14 with the result that when the part 25 of the slot 24 registers with the socket 18 removal of the ball member 10 from the holder 11 is prevented.

The sections of the holder are biased to the relative positions thereof wherein the part 25 of the slot 24 registers with the socket 18 by a coil spring 27. The spring 27 is positioned between the overlying portions of the holder sections and the opposite ends respectively abut shoulders 28 and 29 on the sections 15 and 16 respectively. As shown in Figure 5 of the drawing the shoulders 28 and 29 are arranged in opposed relationship and are spaced from one another lengthwise of the holder 11. The coil spring 27 is held under compression between the two shoulders and hence urges the sections of the holder in directions toward one another. The extent of relative movement of the sections in response to the spring 27 is determined by a stop in the form of a flange 30 depending from the section 16 and engageable with the adjacent end 17 of the section 15. As stated above, the narrow part 25 of the slot 24 registers with the socket 18 in the normal relative position of the holder so that the ball member 10 is retained in pivotal engagement with the socket 18. In the event it is desired to remove the ball member 10 the sections of the holder are relatively moved against the action of the spring 27 to register the enlarged part 26 of the slot 24 with the socket 18. Since the diameter of the enlarged part 26 of the slot 24 exceeds the diameter of the ball 14 it follows that the member 10 may be detached from the holder by merely lifting the same out of the socket 18.

Referring again to Figure 4 of the drawing, it will be noted that the section 15 is fashioned with a downwardly extending embossment 31 which extends lengthwise of the section 15 between opposite edges thereof. The section 16 is fashioned with an embossment 32 also extending lengthwise of the holder and cooperating with the embossment 31 to provide a housing for the spring 27. Thus, the spring 27 is held in position by the sections of the holder without the benefit of separate fastening means. It will also be noted that the spring 27 not only biases the sections of the holder to the relative positions thereof wherein the ball member 10 is retained on the holder but in addition serves to maintain the holder sections in assembled relationship.

What I claim as my invention is:

1. In a ball joint, a holder comprising first and second elongated sections connected together in superposed relation for relative sliding movement in the direction of their length, the first section having a socket opening in a direction toward the second section, the second section being provided with a keyhole shaped slot having the relatively narrow portion registrable with the open end of said socket in one relative position of said sections and having the relatively enlarged portion registrable with the open end of said socket in another relative position of said sections, opposed shoulders on said first and second sections, a spring held under compression between said shoulders and urging said sections in one direction to the said one relative position, and another shoulder on one of said sections engageable with the other section to prevent the relative movement of said sections in said one direction beyond said one position, said spring holding said sections in assembled relationship by limiting relative movement thereof in the opposite direction, said socket being hemispherically shaped, said sections being in the form of sheet metal stampings, the sliding connection between said sections being provided by return bent integral tabs on opposite sides of one of said sections defining grooves slidably receiving the opposite side edges of the other of said sections, and said sections having registering oppositely extending embossed portions cooperating with one another to provide a housing enclosing said spring.

2. In a ball joint, a holder comprising first and second sections connected together for relative sliding movement, said first section having a socket opening toward said second section, said second section being provided with a keyhole shaped slot having the relatively narrow portion registrable with said socket in one relative position of said sections and having the relatively enlarged portion registrable with said socket in another relative position of said sections, opposed shoulders on said first and second sections, a spring held under compression between said shoulders and urging said sections in one direction to the said one relative position, another shoulder on one of said sections engageable with the other of said sections to prevent relative movement of said sections in said one direction beyond said one position, said spring holding said sections in assembled relationship by limiting relative movement thereof in the opposite direction, the sliding connection between said sections being provided by return bent integral tabs on opposite sides of one of said sections defining grooves slidably receiving the opposite side edges of the other of said sections, and said sections having registering oppositely extending embossed portions cooperating with one another to provide a housing enclosing said spring.

3. In a ball joint, a holder comprising first and second elongated sections connected together in superposed relation for relative sliding movement in the direction of their length, the first section having a socket opening in a direction toward the second section, the second section being provided with a keyhole shaped slot having the relatively narrow portion registrable with the open end of said socket in one relative position of said sections and having the relatively enlarged portion registrable with the open end of said socket in another relative position of said sections, opposed shoulders on said first and second sections, a spring held under compression between said shoulders and urging said sections in one direction to the said one relative position, cooperating engaging means on said sections engageable with each other to prevent the relative movement of said sections in said one direction beyond said one relative position, said spring holding said sections in assembled relationship by limiting relative movement thereof in the opposite direction, and said sections having registering oppositely extending embossed portions cooperaing with one another to provide a housing enclosing said spring.

4. In a ball joint, a holder comprising first and second sections connected together for relative sliding movement, the first section having a socket opening in a direction toward the second section, the second section being provided with a keyhole shaped slot having the relatively narrow portion registrable with the open end of said socket in one relative position of said sections and having the relatively enlarged portion registrable with the open end of said socket in another relative position of said sections, spring means urging said sections in one direction to the said one relative position, cooperating engaging means on said sections engageable with each other to prevent the relative movement of said sections in said one direction beyond said one relative position, said spring means holding said sections in assembled relationship by limiting relative movement thereof in the opposite direction, and said sections having registering portions cooperating with each other to provide a housing enclosing said spring means.

5. In a joint, a holder comprising first and second sections connected together for relative sliding movement, the first section having a receiver formation, the second section being provided with a slot having a relatively small portion registerable with said receiver formation in one relative position of said sections and having a relatively large portion registerable with said receiver formation in another relative position of said sections, spring means urging said sections in one direction to the said one relative position, cooperating engaging means on said sections engageable with each other to prevent the relative movement of said sections in said one direction beyond said one relative position, said spring means holding said sections in assembled relationship by limiting relative movement thereof in the oposite direction, and said sections having registering portions cooperating with each other to provide a housing enclosing said spring means.

References Cited in the file of this patent

UNITED STATES PATENTS

| 864,353 | Allenbrand | Aug. 27, 1907 |
| 1,055,440 | Baden | Mar. 11, 1913 |
| 2,592,956 | Saber | Apr. 15, 1952 |

FOREIGN PATENTS

| 725,095 | France | of 1913 |